United States Patent [19]
Janthur et al.

[11] Patent Number: 4,619,073
[45] Date of Patent: Oct. 28, 1986

[54] ADJUSTABLE SHUTTER ASSEMBLY AND METHOD OF MAKING THE SAME

[75] Inventors: Ingo W. Janthur, Berlinger; Alfred Roth, Undenheim; Stefan Odry, Darmstadt, all of Fed. Rep. of Germany

[73] Assignee: General Motors Corporation, Detroit, Mich.

[21] Appl. No.: 739,582

[22] Filed: May 30, 1985

[30] Foreign Application Priority Data

Jun. 1, 1984 [DE]   Fed. Rep. of Germany ....... 3420419

[51] Int. Cl.⁴ ............................................. E05F 17/00
[52] U.S. Cl. ......................................... 49/74; 49/51; 98/121.2
[58] Field of Search .................... 49/74, 64, 51, 92, 87, 49/88; 98/121.2

[56] References Cited

U.S. PATENT DOCUMENTS

| | | |
|---|---|---|
| 1,724,472 | 8/1929 | Good . |
| 1,910,905 | 5/1933 | Petersen . |
| 1,950,218 | 3/1934 | Bierbach ............................ 49/88 X |
| 1,977,538 | 10/1934 | Anderson . |
| 2,901,961 | 9/1959 | Cotts . |
| 3,759,056 | 9/1973 | Graber . |
| 3,780,640 | 12/1973 | Fruth ............................. 98/121.2 X |

FOREIGN PATENT DOCUMENTS

2744453   4/1979   Fed. Rep. of Germany .

*Primary Examiner*—Kenneth Downey
*Attorney, Agent, or Firm*—R. L. Phillips

[57]  ABSTRACT

In a shutter assembly, individual shutter blades are connected to ribs of an auxiliary frame by way of living-type hinges, so that the living-type hinges form the pivot axes of the shutter blades. Furthermore, an actuating rod is provided, which is also connected by way of living-type hinges to the shutter blades. The auxiliary frame with the shutter blades and the actuating rod are thus combined into one structural unit which can be manufactured in one single operation in a three-part mold. This arrangement enables the shutter assembly to be manufactured at low cost by the injection molding technique so that assembly operations become unnecessary.

6 Claims, 10 Drawing Figures

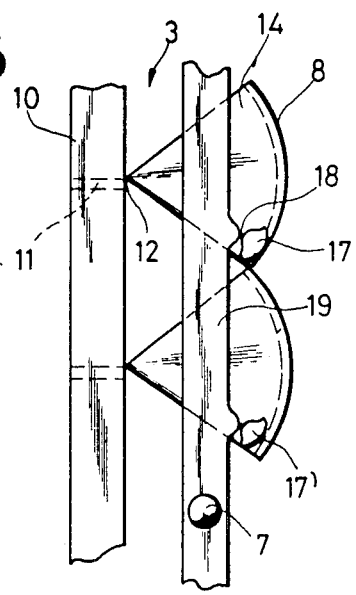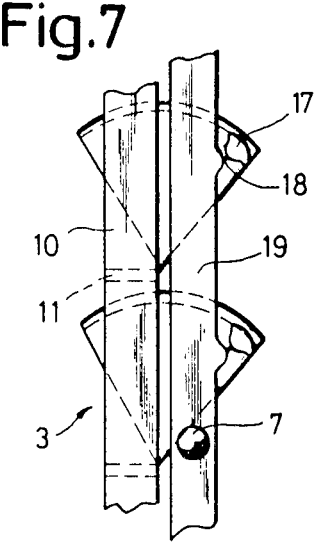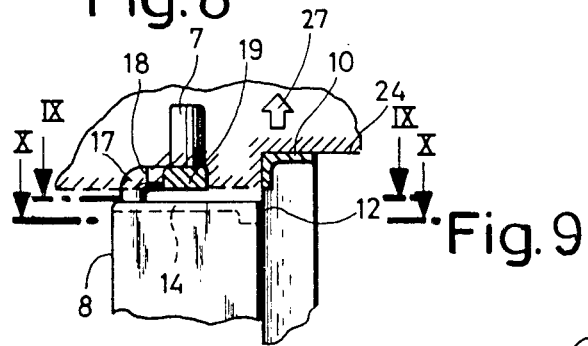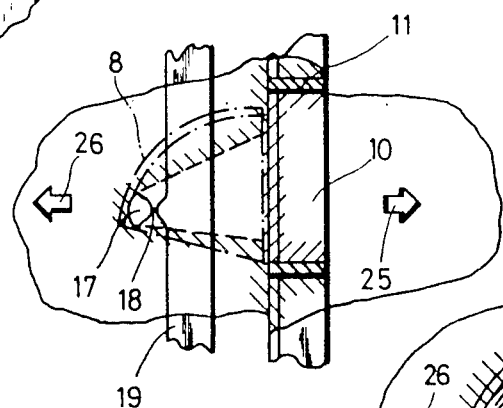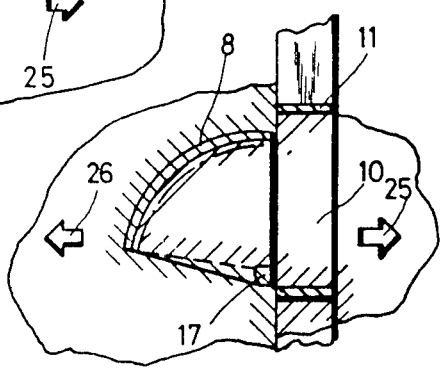

ADJUSTABLE SHUTTER ASSEMBLY AND METHOD OF MAKING THE SAME

TECHNICAL FIELD

This invention relates to an adjustable shutter assembly, including a plurality of shutter blades which are adapted for pivotal movement about parallel axes, and which, for the purpose of adjustment, are pivotally connected to a common actuating rod. The invention also relates to a method of manufacturing a shutter assembly of this type.

BACKGROUND OF INVENTION

Air shutters of this type are generally known in the art and are utilized for a variety of purposes. One example representative of the state of the art is the air shutter assembly for an air conditioning system disclosed in U.S. Pat. No. 2,901,961. This shutter assembly is comprised of a plurality of arcuate blades which are arranged for pivotal movement about stationary pivot axes. Each blade is provided with a short arm which is adapted to engage by way 'of a pin into an oblong aperture of an actuating rod whose longitudinal movement thereby causes pivotal movement of the shutter blades.

The above state of the art shutter assembly is comprised of numerous parts which are relatively costly to manufacture and assemble. And inasmuch as shutters are mass-produced articles, the object should be to keep manufacturing costs as low as possible.

In German Patent DE-OS No. 27 44 453 there is disclosed a shutter assembly in which flaps of the living-hinge type are formed onto a basic body made of plastics so as to form a one-piece molded plastic part. The air distributing flap disclosed in this German patent is used in motor vehicle heating systems and does not require a complex actuating mechanism as is the case with shutter assemblies having a great number of adjustable shutter blades.

SUMMARY OF THE INVENTION

It is an object of the present invention to provide an adjustable shutter mechanism of the type described in the foregoing which can be manufactured at a relatively low cost. The invention also proposes a method of making such a shutter assembly.

The first mentioned object is accomplished in accordance with the present invention with shutter blades which form a one-piece construction with an auxiliary frame and are joined with ribs of an auxiliary frame by means of living hinges, and wherein the shutter blades form one single unit with the actuating rod by way of respective additional living hinges.

A shutter assembly of this type, made in accordance with the invention, is easy to manufacture and does not require any assembly operations. Due to the fact that the pivot axes are made up of living-type hinges, they need not be serviced and their operation is silent.

An arrangement of the present invention which is particularly advantageous is one in which the pivoting axes of the shutter blades are disposed outside of the principal area of blade extension, because this will provide satisfactory sealing of the blades without causing any wear as a result of friction.

Another arrangement which provides very satisfactory sealing of the blades without any frictional wear is one in which the shutter blades are of arch-shaped configuration in the direction extending transversely of the principal direction of blade extension and wherein the axis of curvature coincides with the pivot axis of the shutter blades. The arcuate configuration of the shutter blades is also advantageous in terms of lower retaining forces. Therefore, only relatively low forces act on the actuating mechanism even under conditions of high air velocities. This enables wax elements, such as are used in cooling system thermostats, to be employed in the actuating mechanism of the shutter blades.

A suitable arrangement of mounting the shutter assembly in place, as for instance in front of an automotive cooling radiator, is one in which the auxiliary frame of the shutter assembly is accommodated in a support frame. A support frame of this type adds stability to the assembly and provide lateral sealing, without the need for the frame to engage the shutter blades.

It has been found that a labyrinth-type sealing arrangement of the individual shutter blades can be realized if the support frame has lateral screens that are provided on their inner sides with arcuate recesses whose curvatures correspond to those of the shutter blades.

The second mentioned objective, i.e., the one of providing a method of manufacturing a shutter blade assembly of the type proposed by the present invention, is achieved in accordance with the invention in that a three-part mold is employed which is arranged such that when a sliding member is laterally pulled aside, the actuating rod, which has the pin and the living-type hinge molded thereto, is first exposed, whereupon the two mold-halves are separated. This method of manufacture provides that completely finished shutters can be withdrawn from the mold, i.e., shutters which require no post-finishing or assembly operations.

It will also be appreciated that a variety of arrangements may be utilized in the practice of the invention. To convey the concept of the invention, one exemplary embodiment is illustrated in the drawings. Furthermore, one configuration of a mold is shown to explain the method of manufacture.

DESCRIPTION OF THE DRAWINGS

FIG. 6 is an enlarged side elevation of the shutter assembly with the shutter blades in the closed position.

FIG. 7 is an enlarged side elevation of the shutter assembly with the shutter blades in the open position.

FIG. 8 is a sectional view of a portion of a mold for making the shutter assembly.

FIG. 9 is a section through the mold along line 9—9 in FIG. 8.

FIG. 10 is a section through the mold along line 10—10 in FIG. 8.

DESCRIPTION OF PREFERRED EMBODIMENT

Figure 1:
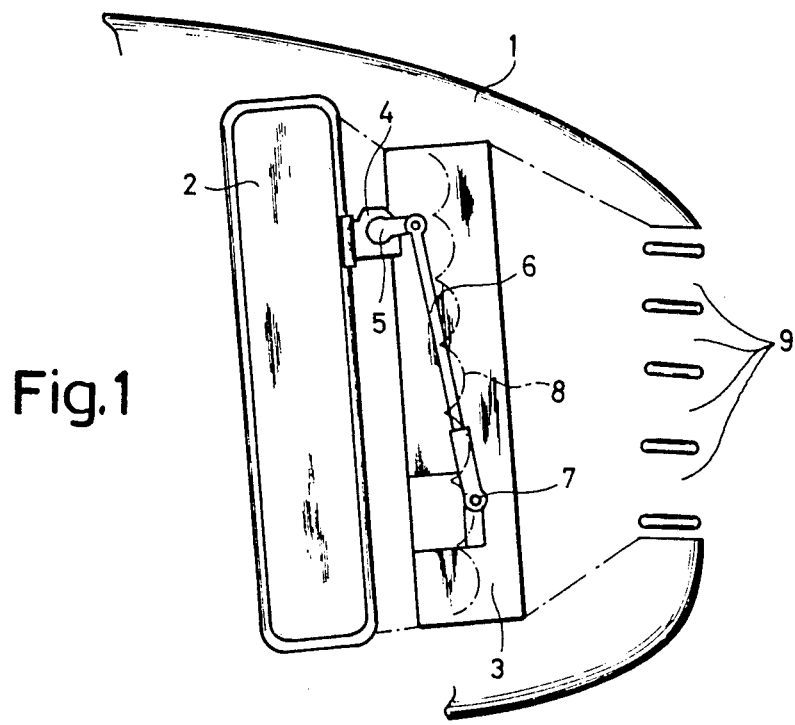
FIG. 1 is a schematic sectional view of the front portion of a motor vehicle equipped with the shutter assembly according to the invention.

FIG. 1 illustrates an engine hood 1 of a motor vehicle with an engine cooling radiator mounted therebeneath.

In front of the radiator 2, as viewed in the direction of vehicle travel, there is arranged an adjustable shutter assembly 3, which is usually referred to as a radiator jalousie when employed in motor vehicles. Adjustment of the shutter 3 is by way of a control member 4 which, depending on the water temperature in the radiator 2, causes an arm 5 to be pivoted to a greater or lesser degree. This arm 5 is coupled by means of a rod 6 to a pin 7 of the shutter assembly. Displacement of the pin 7 causes, in a manner to be described later, the shutter blades 8, which are illustrated in FIG. 1 by dash-dotted lines to be pivoted so that in accordance with the respective position of the blades 8, a larger or smaller amount of air flowing through the grille 9 and the shutter assembly 3 is admitted to the radiator.

Figure 2:
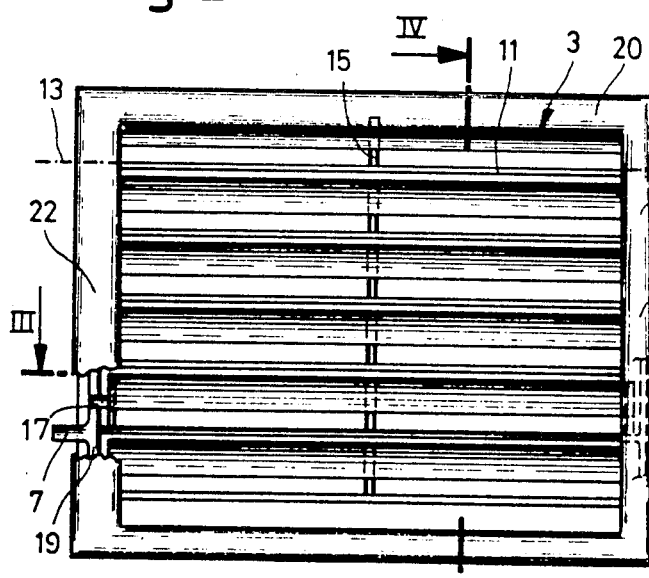
FIG. 2 is a view of the shutter according to FIG. 1, installed in a support frame, as viewed from the front.
Figure 4:
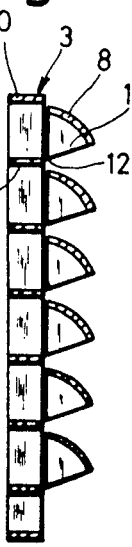
FIG. 4 is a vertical section through the shutter assembly along line 4—4 of FIG. 2.
Figure 3:
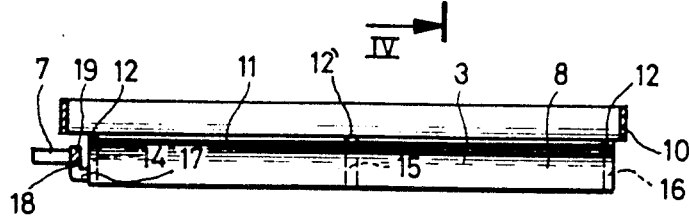
FIG. 3 is a horizontal section through the shutter along line 3—3 of FIG. 2.

The details of construction of the shutter assembly 3 are illustrated in FIGS. 2, 3 and 4 and includes an auxiliary frame 10 with horizontally aligned ribs 11, with each rib having attached thereto a blade 8 by means of a living-type hinge 12. This arrangement enables pivoting of the living-type hinges 12 about respective pivot axes 13, one of which is indicated in FIG. 2. The individual shutter blades 8 are arch-shaped transversely to their axis of principal extension and their curvature is such that the axis of curvature coincides with the pivot axis 13. Furthermore, each blade 8 as seen in FIGS. 3 and 4 is provided with sector-shaped members 14, 15, 16 or 16' which are connected with the ribs 11 by means of the living-type hinges 12 or 12'.

Each blade 8 is also provided on the side of the outer sector-shaped member 14 with a laterally extending portion 17 which, as seen in FIG. 3, are connected by means of respective living-type hinges 18, to a common actuating rod 19. This actuating rod 19 is provided with the pin 7, mentioned earlier in conjunction with FIG. 1, through which the actuating rod 19 is axially displaceable by way of the control rod 6, to cause the shutter blades 8 to open or close.

Figure 5:
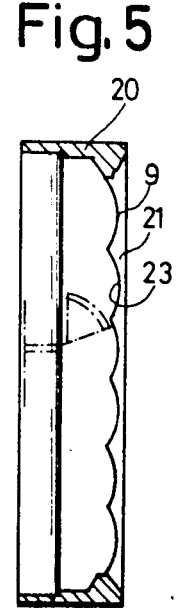
FIG. 5 is a vertical section through the support frame for mounting the shutter assembly.

FIG. 5 is a sectional view of the support frame 20 into which the auxiliary frame is insertable from, as viewed in FIG. 5, the left side. This support frame 20 has, as is apparent from FIG. 2, lateral screens 21, 22 which are provided on their inner sides, as illustrated in FIG. 5, with arcuate recesses 23 whose curvatures correspond to those of the shutter blades 8. This arrangement yields a labyrinth-like lateral sealing effect between the shutter blades 8 and the support frame 20.

The operation of the shutter assembly 3 will become readily apparent from FIGS. 6 and 7. In these figures, one will notice the auxiliary frame 10 with its ribs 11 to which the sector-shaped members 14 or 15, 16 with the shutter blades 8 are pivotally connected by means of living-type hinges 12. Furthermore, one will recognize the respective extending portions 17 or 17' on the lateral sector-shaped members 14 or 15, 16 which are joined with the actuating rod 19 by way of the living-type hinges 18.

In FIG. 6, the shutter blades 8 are concealed the auxiliary frame entirely, and the louvers are therefore closed. When the actuating rod is lifted up, the extending portions 17 are raised by way of the living-type hinges 18, which causes the shutter blades 8 to be pivoted in a counterclockwise direction and to be moved into the "open" position.

The method of manufacture will now be described in conjunction with FIGS. 8, 9 and 10. In FIG. 8 one will notice a shutter blade 8 with its sector-shaped member 14 which is connected with the auxiliary frame 10 by way of the living-type hinge 12. One will also notice the actuating rod 19 with the pin 7 as well as the extending portion 17. The mold separation is indicated by the diagonal lines 24. During the fabricating procedure, a sliding member 27 is first pulled aside in the direction of the arrow in FIG. 8, so that the actuating rod 19 with the integrally formed pin 7 and the living-type hinge 18 are exposed. Subsequently, the two mold-halves identified in FIGS. 9 and 10 by the numerals 25 and 26, may be separated in the direction of the arrows in FIGS. 9 and 10. The finished shutter assembly 3 can now be removed while the mold is in a semi-open position.

The embodiments of the invention in which an exclusive property or privilege is claimed are defined as follows:

1. In an adjustable shutter assembly comprised of a plurality of shutter blades adapted for pivotal movement about parallel pivot axes, said shutter blades being articulated to a common actuating rod extending along one end of all the blades so as to effect adjustment of the blades, the improvement comprising:

the shutter blades being combined with an auxiliary frame so as to form a unitary structure therewith and being connected with ribs of the auxiliary frame by way of living-type hinges and forming a unitary structure with the actuating rod by way of respective further living-type hinges at said one end of the blades extending transverse to the first-mentioned hinges and joined to the respective one end of the blades by a portion extending laterally from each said one end.

2. In an adjustable shutter assembly according to claim 1, the improvement further comprising:

the pivot axes of the shutter blades being disposed outside of the principal surface of extension of the shutter blades.

3. In an adjustable shutter assembly according to claim 1, the improvement further comprising:

the shutter blades being bow-shaped transversely of their direction of principal extension and the axis of curvature coinciding with the pivot axis of the respective shutter blades.

4. In an adjustable shutter assembly according to claim 1, the improvement further comprising:

the auxiliary frame being inserted in a support frame.

5. In an adjustable shutter assembly according to claim 1, the improvement further comprising:

the support frame having lateral screens which are provided on their inner side with arcuate recesses whose curvature corresponds to that of the shutter blades.

6. In a method of making an adjustable shutter assembly according to claim 1, the improvement comprising:

using a three-part mold comprising two halves and a sliding member which are arranged such that when the sliding member is pulled aside, the actuating rod together with the pin molded thereto and the living-type hinges are first exposed and the two mold halves are then separated.

* * * * *